Patented June 28, 1949

2,474,207

UNITED STATES PATENT OFFICE 2,474,207

ESPECIALLY REACTIVE LIME AND METHOD OF PRODUCING IT

Wheeler G. Lovell, Verle A. Miller, Maurice J. Mulligan, and Hart K. Lichtenwalner, Detroit, Mich., assignors to General Motors Corporation, Detroit, Mich., a corporation of Delaware No Drawing. Application July 23, 1945, Serial No. 606,710

4 Claims. (Cl. 23—186)

This invention relates to a method for producing lime, chemically chiefly calcium oxide, in such a condition that it is very reactive and enters into chemical action with other materials at an especially rapid rate.

The general problem of arranging for a solid to react with a gas or liquid at a rapid or useful rate is an old one, and frequently such reactions are very slow or useless because the contact between the reacting molecules is limited to the surface of the solid or controlled by the diffusion rates at such a surface or diffusion into the solid itself. Calcium oxide or quick-lime, is generally a readily produced or inexpensive material and would be useful for many purposes for which it has not heretofore been used if it could be made more reactive.

Various methods have been proposed prior to our invention in attempts to increase the reactivity of calcium oxide, many of them directed towards increasing the available surface per unit mass of solid as by grinding or mechanical subdivision. So far as we are aware none of these attempts has been successful in producing a highly reactive lime. The primary object of our invention is to provide an especially reactive lime and to provide a new and improved method for making the same.

In accordance with our invention the reactivity and available or effective surface of lime is increased by careful control of the effective temperature and heating conditions involved in its preparation with the result that a new and novel material of hitherto unrealized chemical activity is produced. The new and improved method comprises preparing calcium oxide or quick-lime not by heating the carbonate or naturally occurring limestone, but by heating the calcium hydrate or hydroxide under carefully controlled conditions so as to produce a material containing mostly the oxide in a form characterized by extreme reactivity. The hydroxide may be produced by slaking, or reacting with water or steam, the oxide previously prepared from the carbonate; so from this standpoint the method might be thought of as a double calcination.

The heating of the hydrate or hydroxide is carried out at a low effective temperature and under controlled conditions in order to produce the desired degree of reactivity and in fact if the effective temperature is exceeded the reactivity is lost. With this in mind it is easy to understand why the oxide prepared from the carbonate does not have this great reactivity because the carbonate decomposes to the oxide at such high temperatures that the activity of the resulting oxide is lost.

The method comprises heating the hydroxide or hydrate under carefully controlled conditions such that most but not all the water of constitution is removed. We have found that the reactivity of the product is at a maximum when the calcination is carried approximately 85% to completion, that is to the point where about 15% of calcium hydroxide remains in the end product. On a scale showing absorption numbers (index of the reactivity of the lime) the product produced in this way consisting of 15% calcium hydroxide and the balance calcium oxide and normal impurities found in lime has a value of above 6800, whereas when the hydrate has been completely calcined to the oxide a value of only 2400 is obtained. Each absorption number as given herein is an index of the external and capillary surface of the lime and is measured by the amount of a dye substance which is absorbed by the lime from a solution in which the lime is insoluble. The numerical values of absorption number are obtained by mixing one gram of lime with 100 milliliters of a substantially saturated solution of Sudan 2B, an oil soluble red dye, in a mixture of amylenes, and after two hours filtering off the solution. The absorption number is calculated as the change in dye concentration multiplied by the volume (in milliliters) of dye solution divided by the weight of sample in grams. These absorption numbers which are an index of the available surface of the lime per unit mass are also related to the reactivity or speed of reaction of the lime with water vapor and other materials. The reactivity drops off rapidly when the calcination is carried out to the point where there is something less than 10% calcium hydroxide in the end product. In general the desired high reactivity of the lime is obtained when the calcined product is composed of about 10% to 20% calcium hydroxide and the balance calcium oxide and normal impurities found in lime. When completely calcined to the oxide, lime produced from the hydrate is no better than the commercial grade. Moreover, merely adding water to commercial quicklime to obtain the water content does not increase the reactivity.

The times and temperatures of heating are carefully controlled to produce the reactive material composed of about 10% to 20% calcium hydroxide and the balance calcium oxide and normal impurities found in lime. Higher temperatures require shorter times of heating, while lower temperatures require longer heating times. Lower temperatures favor more reactive lime. Furnace temperatures on the order of 600° C. to 800° C. have proven satisfactory in practice, the lower temperature being preferred. The heating operation may be carried out in any suitable manner. For example, a continuous rotary lime kiln may conveniently be employed. The temperature and rates of feed are adjusted that the product, preferably calcined uniformly, has the required amount of residual hydroxide. The lime may be fed to the kiln as dry hydrate, as a slurry with water or in other suitable form. The heating operation may also be conducted in pots or in other suitable equipment.

We claim:

1. The method of producing an especially reactive lime which includes heating calcium hydroxide at low effective temperature under controlled conditions to remove most but not all of the water of constitution therefrom, the heating being discontinued when the product contains calcium hydroxide within the range of about 10% to 20%.

2. The method of producing an especially reactive lime which includes heating calcium hydroxide at a low effective temperature under controlled conditions to form a product composed substantially as follows: 15% calcium hydroxide and the balance calcium oxide and normal impurities found in lime.

3. The product prepared according to claim 1.

4. The product prepared according to claim 2.

WHEELER G. LOVELL.
VERLE A. MILLER.
MAURICE J. MULLIGAN.
HART K. LICHTENWALNER.

REFERENCES CITED

The following references are of record in the file of this patent:

UNITED STATES PATENTS

| Number | Name | Date |
| --- | --- | --- |
| 1,710,967 | Crow | Apr. 30, 1929 |
| 2,305,031 | Rarey et al. | Dec. 15, 1942 |

OTHER REFERENCES

Mellor, "Inorganic and Theoretical Chemistry," vol. 3, pp. 673–674, and 682.